United States Patent [19]
Sutherland

[11] Patent Number: 5,931,499
[45] Date of Patent: Aug. 3, 1999

[54] VEHICLE STABILIZING APPARATUS

[75] Inventor: Daniel R. Sutherland, Sterling Heights, Mich.

[73] Assignee: TRW Vehicle Safety Systems Inc., Lyndhurst, Ohio

[21] Appl. No.: 09/059,825

[22] Filed: Apr. 14, 1998

[51] Int. Cl.$^6$ .................................................. B60S 9/00
[52] U.S. Cl. .................... 280/755; 180/282; 280/164.1; 280/763.1; 280/764.1; 280/766.1
[58] Field of Search .................................. 280/755, 756, 280/763.1, 764.1, 765.1, 766.1, 164.1, 166; 180/282; 301/128

[56] References Cited

U.S. PATENT DOCUMENTS

| | | |
|---|---|---|
| 1,231,531 | 6/1917 | Shilling . |
| 1,373,655 | 5/1921 | Daniel et al. ............................ 280/755 |
| 1,932,031 | 10/1933 | Bellantese . |
| 2,767,995 | 10/1956 | Stout . |
| 2,973,209 | 2/1961 | Shaw . |
| 2,986,295 | 5/1961 | Shaffer . |
| 3,004,770 | 10/1961 | Bettenhausen . |
| 3,397,898 | 8/1968 | Denney et al. . |

FOREIGN PATENT DOCUMENTS

| | | | |
|---|---|---|---|
| 1915753 | 2/1971 | Germany ............................... | 280/756 |
| 4426733 | 2/1995 | Germany ............................... | 280/756 |
| WO94/06642 | 3/1994 | WIPO .................................. | 280/763.1 |

*Primary Examiner*—Eric Culbreth
*Attorney, Agent, or Firm*—Tarolli, Sundheim, Covell, Tummino & Szabo

[57] ABSTRACT

An apparatus includes a vehicle stabilizer (16) and a structure (14) which supports the stabilizer (16) on a vehicle (10) for movement to a deployed position. When the stabilizer (16) is in the deployed position, it projects laterally from the vehicle (10) so as to restrain rolling of the vehicle (10). A stabilizer control system (18) moves the stabilizer to the deployed position when the vehicle (10) experiences a rollover crash. The stabilizer control system (18) includes a source of energy (92) for moving the stabilizer (16) to the deployed position, a sensor (106) for sensing the occurrence of a rollover crash, and a device (90) for responding to the sensor (106) by actuating the source of energy (92) upon the occurrence of a rollover crash.

9 Claims, 4 Drawing Sheets

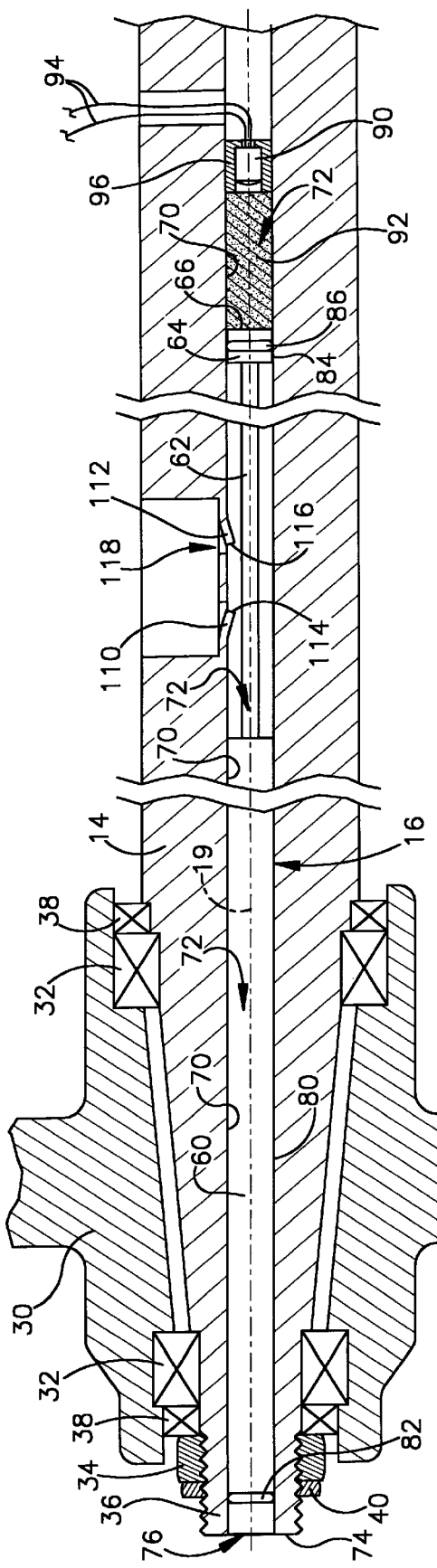
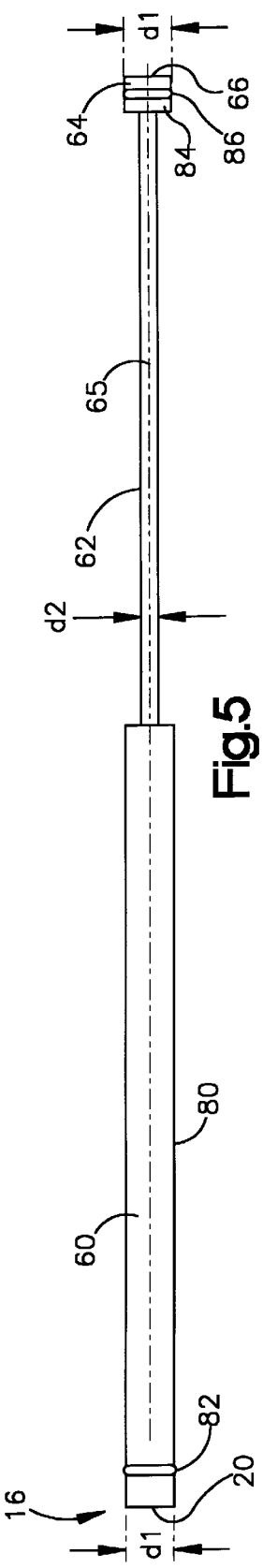
Fig.4
Fig.5

VEHICLE STABILIZING APPARATUS

FIELD OF THE INVENTION

The present invention relates to an apparatus for stabilizing a vehicle upon the occurrence of a rollover crash.

BACKGROUND OF THE INVENTION

A vehicle crash that involves rolling of the vehicle, i.e., overturning movement of the vehicle in a sideways direction, is known as a rollover crash.

SUMMARY OF THE INVENTION

In accordance with the present invention, an apparatus comprises a vehicle stabilizer and a structure which supports the stabilizer on a vehicle for movement to a deployed position. When the stabilizer is in the deployed position, it projects laterally from the vehicle so as to restrain rolling of the vehicle. The apparatus further comprises a stabilizer control system which moves the stabilizer to the deployed position when the vehicle experiences a rollover crash.

The stabilizer control system comprises a source of energy for moving the stabilizer to the deployed position, means for sensing the occurrence of a rollover crash, and means for responding to the sensing means by actuating the source of energy upon the occurrence of a rollover crash.

In the preferred embodiments of the present invention, the supporting structure limits movement of the stabilizer to a predetermined deployed position. The source of energy, when actuated, provides energy that is sufficient to move the stabilizer fully to the predetermined deployed position. The supporting structure then locks the stabilizer in the predetermined deployed position. This feature of the invention helps to ensure that the stabilizer will be fully deployed in a predetermined manner before the vehicle rolls to a position in which the road surface could restrain deployment of the stabilizer.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein:

FIG. 4 is a partly schematic, partly sectional view of parts of the first embodiment of the invention;

FIG. 5 is a view of a part shown in FIG. 4;

DESCRIPTION OF PREFERRED EMBODIMENTS

Figure 1:
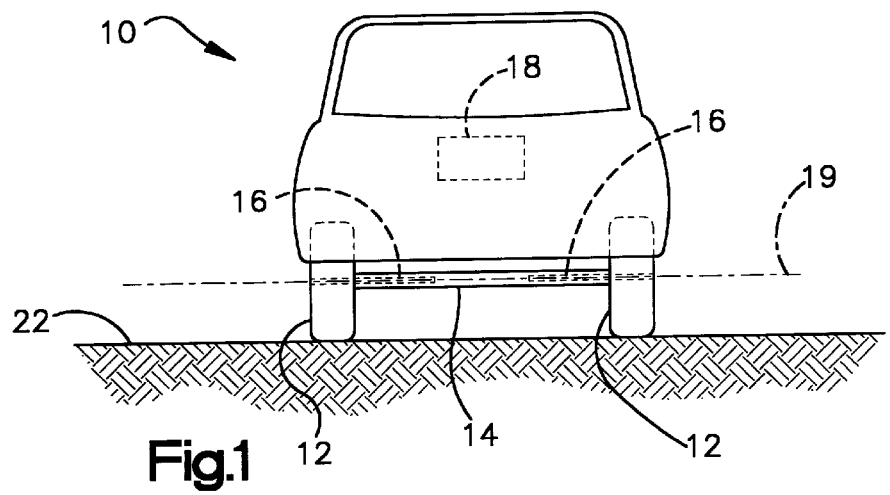
FIGS. 1–3 are schematic views of a vehicle comprising a first embodiment of the invention.
Figure 2:
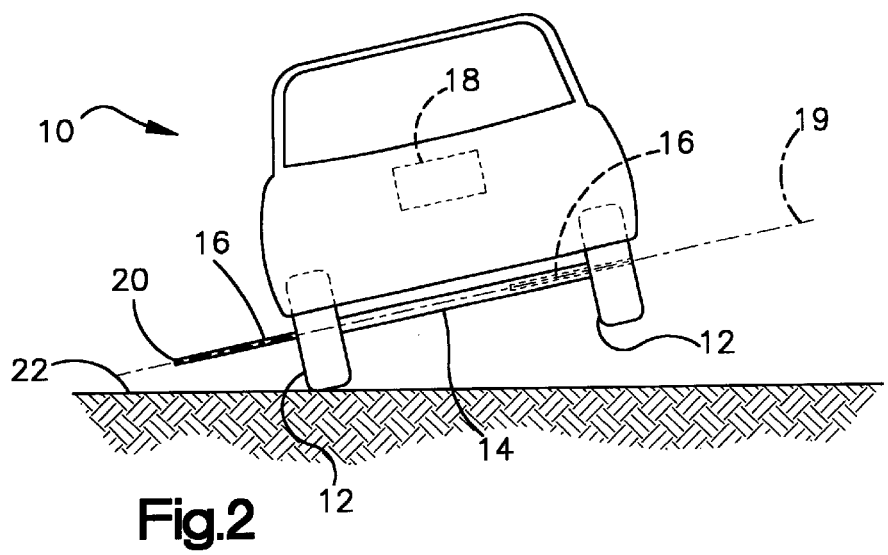
Figure 3:
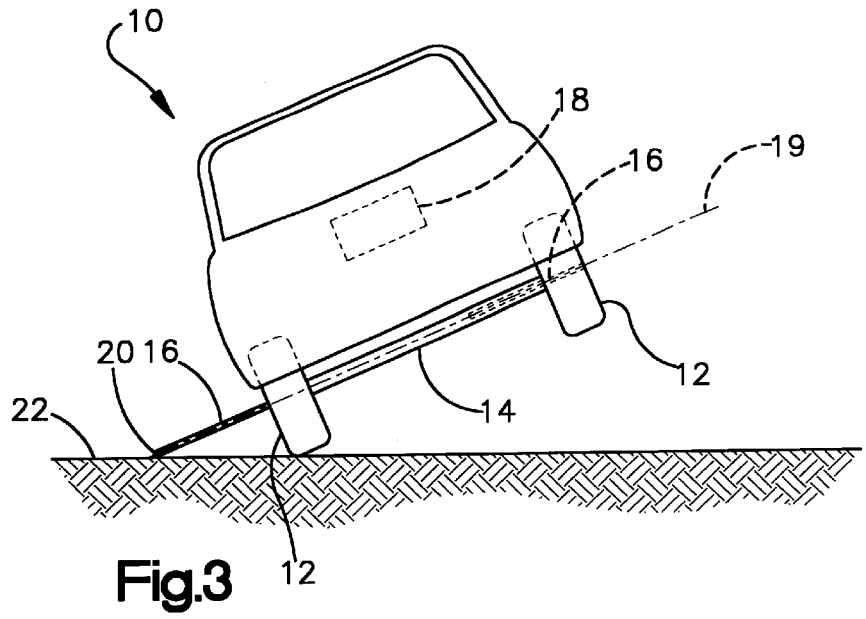

A vehicle 10 comprising a first embodiment of the present invention is shown schematically in FIGS. 1–3. The vehicle 10 has a pair of rear wheels 12 on a rear axle 14. The vehicle 10 further has a pair of stabilizers 16 and a stabilizer control system 18.

The wheels 12 and the axle 14 in the first embodiment of the invention are centered on a common axis 19. As shown schematically in FIG. 1, the stabilizers 16 have retracted positions in which they are contained within the axle 14 on opposite sides of the vehicle 10. When the vehicle 10 rolls to one side in a crash, as shown in FIG. 2, the control system 18 moves the corresponding stabilizer 16 to a deployed position projecting laterally from the vehicle 10 along the axis 19. The deployed stabilizer 16 can restrain further rolling of the vehicle 10 when the outer end 20 of the stabilizer 16 contacts the road surface 22, as shown in FIG. 3.

The wheels 12 are mounted on a pair of hubs 30, one of which is shown partially in FIG. 4. Each hub 30 is rotatably supported on the axle 14 by a pair of wheel bearings 32 (shown schematically). An adjusting nut 34 is screwed onto a threaded end portion 36 of the axle 14 to set the axial positions of the hub 30, the bearings 32, and an adjacent pair of seals 38 (also shown schematically). The adjusting nut 34 is locked in place in a known manner, such by the use of a lock nut 40.

Each stabilizer 16 in the first embodiment of the present invention is a steel bar having the configuration shown in FIG. 5. Each stabilizer 16 thus has first, second, and third cylindrical sections 60, 62, and 64 centered on a longitudinal axis 65. The first section 60 defines the outer end 20 (FIGS. 2 and 3) of the stabilizer 16, and has a first diameter d1 uniformly along its length. The second section 62 extends axially from the first section 60 to the third section 64, and has a second, lesser diameter d2 uniformly along its length. The third section 64, which defines an inner end 66 of the stabilizer 16, is shaped as a piston having the same diameter d1 as the first section 60.

As shown in FIG. 4, the axle 14 has a cylindrical inner surface 70 defining a bore 72 centered on the axis 19. An annular terminal end surface 74 of the axle 14 defines a circular open end 76 of the bore 74.

The stabilizer 16 of FIG. 5 is contained within the axle 14 on the left-hand side of the vehicle 10, as viewed from the rear in FIGS. 1–3. That stabilizer 16 is received in the bore 72 in the manner shown in FIG. 4. (The stabilizer 16 on the right-hand side of the vehicle 10 is received oppositely in the bore 72 in the same manner.) The first section 60 of the stabilizer 16 has a cylindrical outer surface 80 adjoining the cylindrical inner surface 70 of the axle 14. The surfaces 80 and 70 preferably adjoin one another in an interference fit that is tight enough to prevent the stabilizer 16 from sliding axially within the bore 72 during ordinary operation of the vehicle 10. An O-ring 82 is mounted on the first section 60 of the stabilizer 16 near the outer end 20 to protect the adjoining cylindrical surfaces 80 and 70 from dust and dirt.

The piston 64 also has a cylindrical outer surface 84 adjoining the cylindrical inner surface 70 of the axle 14. Another O-ring 86 provides a dynamic fluid seal between the piston 64 and the axle 14.

Also shown in FIG. 4 are parts of the stabilizer control system 18, including a squib 90 and a main charge of pyrotechnic material 92. The squib 90 is a known device which contains a smaller charge of pyrotechnic material (not shown). The pyrotechnic material in the squib 90 is ignited upon the passage of electric current through the squib 90 between a pair of leads 94. A support sleeve 96 supports the squib 90 in the bore 72 at a location spaced axially from the piston 64.

The main charge of pyrotechnic material 92 is contained in the bore 72 between the support sleeve 96 and the piston 64. Although any suitable pyrotechnic material can be used, the main charge of pyrotechnic material 92 preferably comprises a gas generating material, such as $BKNO_3$, that is commonly used to generate inflation gas in air bag inflators.

Figure 6:
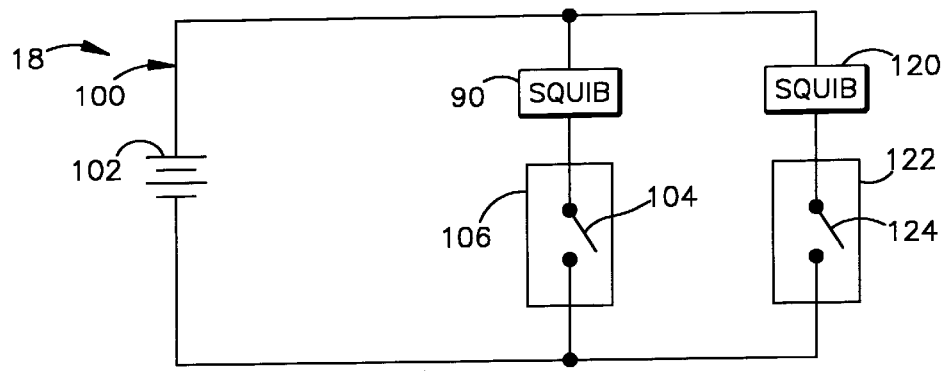
FIG. 6 is a schematic view of an electrical circuit including parts of the first embodiment of the invention.

As shown schematically in FIG. 6, the stabilizer control system 18 comprises an electrical circuit 100 in which the squib 90 is connected with a power source 102 and a normally open switch 104. The power source 102 preferably comprises the vehicle battery and/or a capacitor. The switch 104 is part of a crash sensor 106 which senses vehicle conditions indicating the occurrence of a rollover crash. If the vehicle 10 experiences a rollover crash for which deployment of the stabilizer 16 is desired to restrain rolling of the vehicle 10, as described above, the switch 104 closes and electric current is directed through the squib 90 to actuate the squib 90.

When the squib 90 is actuated in the foregoing manner, the pyrotechnic material in the squib 90 ignites and generates combustion products that are spewed outward from the squib 90. Those combustion products ignite the main charge of pyrotechnic material 92 (FIG. 4). This causes the main charge of pyrotechnic material 92 to generate a large quantity of gas. The gas rapidly becomes pressurized between the support sleeve 96 and the piston 64, and thus develops a thrust which acts axially against the piston 64. When the thrust overcomes the interference fit between the stabilizer 16 and the axle 14, it propels the stabilizer 16 outward of the bore 72 from the retracted position (FIGS. 1 and 4) to the deployed position (FIGS. 2 and 3).

Figure 7:
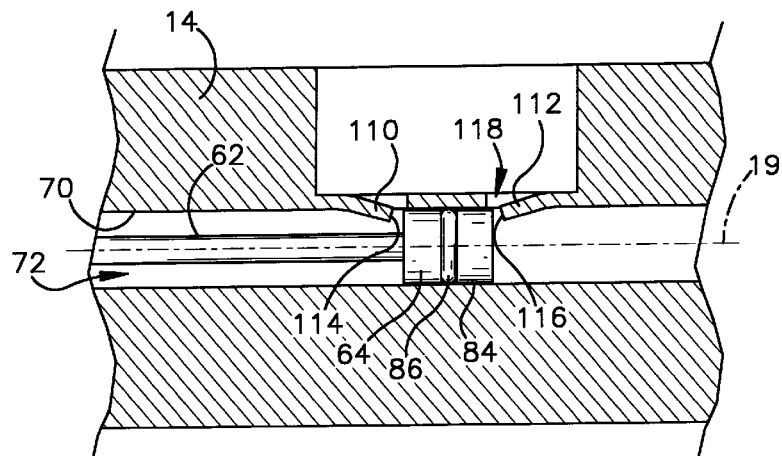
FIG. 7 is a view similar to FIG. 4 showing parts in different positions.

In accordance with a particular feature of the present invention, the axle 14 has a pair of indented tab portions 110 and 112 that are resiliently deflectable pivotally. The tab portions 110 and 112 of the axle 14 project radially inward of the bore 72, and have axially opposed inner ends 114 and 116, respectively. When the stabilizer 16 reaches the deployed position, the piston 64 becomes captured axially between the opposed inner ends 114 and 116 of the tabs 110 and 112, as shown in FIG. 7. The tabs 110 and 112 thus limit movement of the stabilizer 16 outward of the bore 72, and also lock the stabilizer 16 in the deployed position. Additionally, the axle 14 has a slotted configuration at the tabs 110 and 112. This provides an opening 118 for venting of the propellant gas from the bore 72.

As noted above, the stabilizers 16 on the opposite sides of the vehicle 10 are received in the bore 72 in the same manner. The configuration of the axle 14 on the right side of the vehicle 10 is substantially the same (although reversed) as the left side configuration that is shown in FIG. 4. The stabilizer control system 18 likewise has parts on the right side of the vehicle 10 that are substantially the same as the parts 90–96 shown in FIG. 4. Accordingly, the electrical circuit 100 of FIG. 6 includes another squib 120, as well as another rollover crash sensor 122 with a normally open switch 124, for deployment of the stabilizer 16 on the right side of the vehicle 10 in the same manner as described above with reference to deployment of the stabilizer 16 on the left side.

Figures 8, 9:
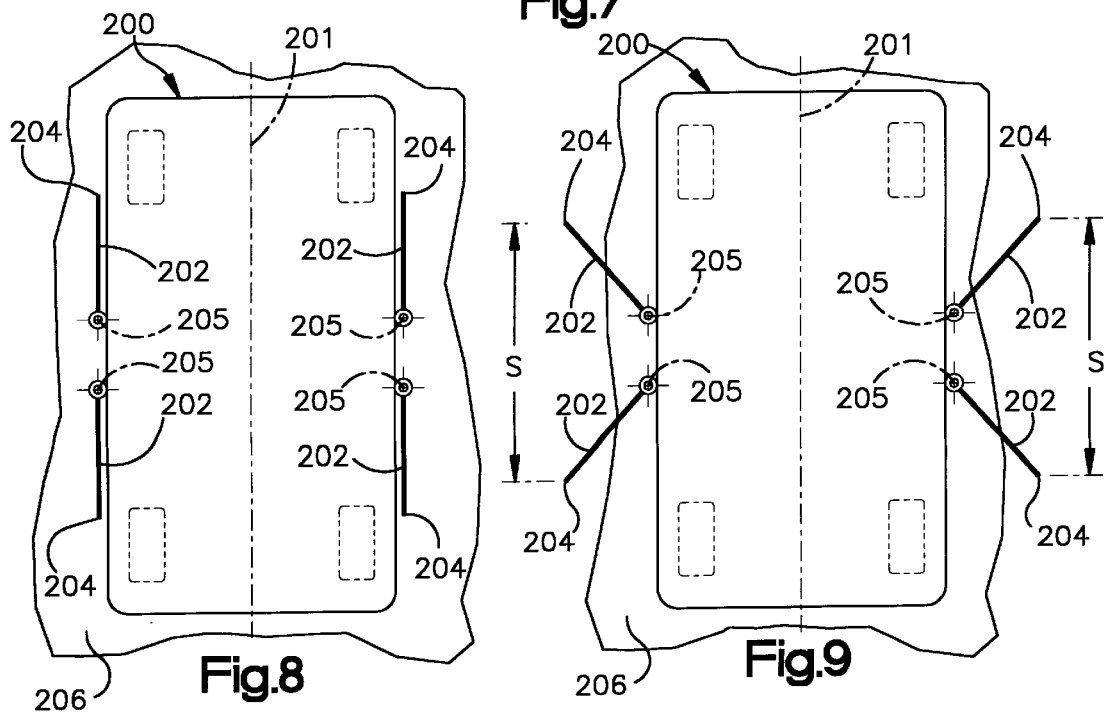
FIGS. 8 and 9 are schematic views of a vehicle comprising a second embodiment of the invention.

A vehicle 200 comprising a second embodiment of the present invention is shown schematically in FIGS. 8 and 9. The vehicle 200 has a longitudinal centerline 201, and has a pair of stabilizers 202 on each side of the centerline 201. The stabilizers 202 in each pair are movable together from retracted positions adjacent the body of the vehicle 200, as shown in FIG. 8, to deployed positions projecting outward from the body of the vehicle 200, as shown in FIG. 9. When the stabilizers 202 on one side of the vehicle 200 are in their deployed positions, they can restrain rolling of the vehicle 200 upon movement of their outer ends 204 into contact with the road surface 206 at that side of the vehicle 200.

Each stabilizer 202 is movable from its retracted position to its deployed position pivotally about a corresponding vertical axis 205. When the stabilizers 202 in each pair are in their retracted positions, they project oppositely from the vertical axes 205 in directions parallel to the vehicle centerline 201. Moreover, the stabilizers 202 in each pair are movable to their deployed positions pivotally about the vertical axes 205 in opposite directions relative to one another. This helps to maximize the spacing S between the outer ends 204 of the deployed pair of stabilizers 202, and thus helps to increase the stability provided by the deployed pair of stabilizers 202.

Figure 10:
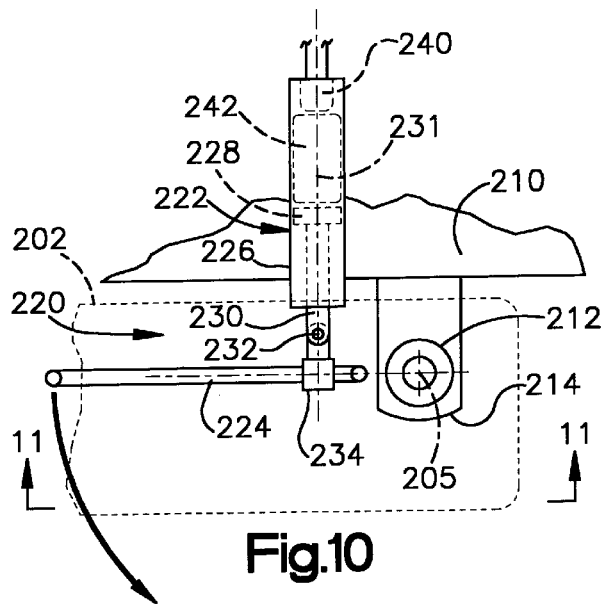
FIG. 10 is a partial view of parts of the second embodiment of the invention.
Figure 11:
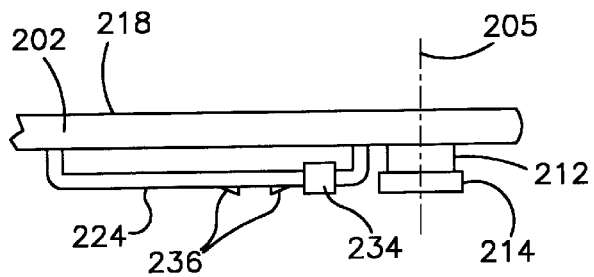
FIG. 11 is a view taken on line 11—11 of FIG. 10.

The stabilizers 202 are mounted on the vehicle frame 210 in the manner shown by way of example in FIGS. 10 and 11. Accordingly, each stabilizer 202 is supported on a bearing 212 which, in turn, is supported on an arm 214 projecting laterally from the frame 210. In accordance with a particular feature of the present invention, each stabilizer 202 preferably has the configuration of a running board with an upper side surface 218 (FIG. 11) defining a step for an occupant to climb into and out of the vehicle 200.

A linkage 220 is connected between the stabilizer 202 and the vehicle frame 210. The linkage 220 includes a piston/cylinder assembly 222 and a guide bar 224. The guide bar 224 extends lengthwise of the stabilizer 202 and is fixed to the stabilizer 202. The piston/cylinder assembly 222 includes a cylinder 226 containing a piston 228 with a piston rod 230. The cylinder 226, the piston 228, and the piston rod 230 are centered on a horizontal axis 231 which is perpendicular to the longitudinal centerline 201 (FIGS. 8 and 9) of the vehicle 200. A pivotal joint 232 connects the piston rod 230 to a sleeve 234 which is slidable along the length of the guide bar 224. A rigid fastening structure (not shown), such as a weld or the like, fixes the cylinder 226 to the frame 210.

The piston cylinder assembly 222 further includes a squib 240 and a charge of pyrotechnic material 242 in the cylinder 226. When the squib 240 is actuated, it emits pyrotechnic combustion products that ignite the charge of pyrotechnic material 242. Like the charge of pyrotechnic material 92 in the first embodiment, the charge of pyrotechnic material 242 in the second embodiment generates a large quantity of gas when ignited. The gas develops a thrust which moves the piston 228, the piston rod 230, and the sleeve 234 along the axis 231 transversely outward relative to the vehicle frame 210. Such movement of the sleeve 234 imparts pivotal movement to the guide bar 224 as the sleeve 234 slides outward along the guide bar 224. The guide bar 224, and hence the stabilizer 202, is thus moved pivotally outward about the vertical axis 205, as indicated by the arrow shown in FIG. 10. The stabilizer 202 is locked in its deployed position when the sleeve 234 becomes captured between a pair of opposed, resiliently pivotal stop members 236 (FIG. 11) which are spaced-apart on the guide bar 224.

Figure 12:
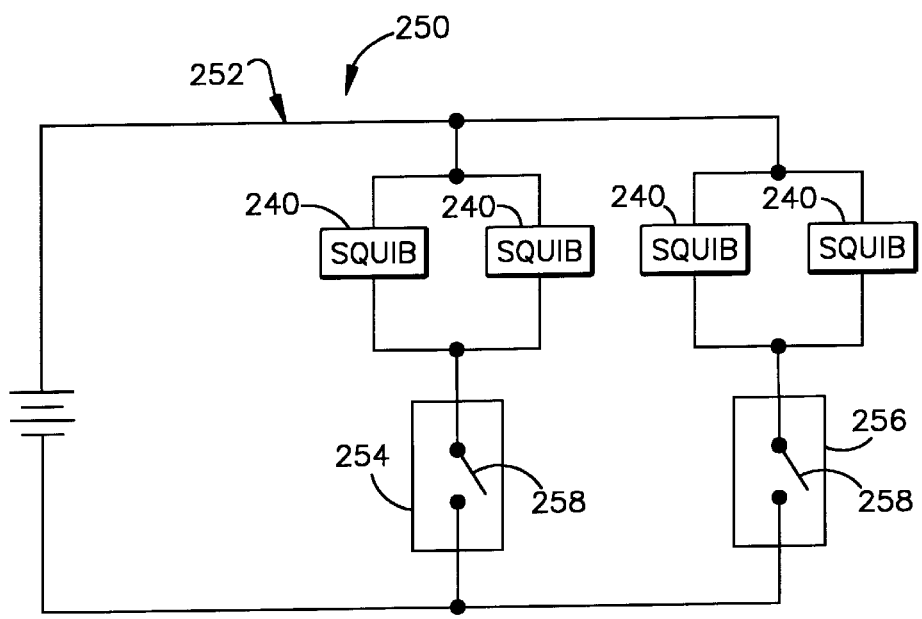
FIG. 12 is a schematic view of an electrical circuit including parts of the third embodiment of the invention.

As shown schematically in FIG. 12, the vehicle 200 has a stabilizer control system 250 comprising an electrical circuit 252. The electrical circuit 252 includes four squibs 240, each of which functions as a source of energy for deploying a corresponding stabilizer 202 in the foregoing manner. The electrical circuit 252 further includes a rollover crash sensor 254 for the pair of squibs 240 at the left side of the vehicle 200, and a rollover crash sensor 256 for the pair of squibs 240 at the right side of the vehicle 200. Each of the crash sensors 254 and 256 includes a normally open switch 258 that closes upon the occurrence of a corresponding rollover crash. When a switch 258 closes, the corresponding pair of squibs 240 are actuated simultaneously. Accordingly, when the vehicle 200 rolls to one side in a crash, the pair of stabilizers 202 (FIGS. 8 and 9) at that side of the vehicle 200 are deployed simultaneously.

From the above description of the invention, those skilled in the art will perceive improvements, changes and modifications. For example, the stabilizers 16 in the first embodiment of the invention are supported by a single rear axle 14 extending fully across the vehicle 10 between the rear wheels 12. An alternative embodiment of the invention could include a pair of rear axles that are pivotally supported on opposite sides of a vehicle, with each rear axle supporting a stabilizer in substantially the same manner as described above with reference to the single axle 14. Such improvements, changes and modifications within the skill of the art are intended to be covered by the appended claims.

Having described the invention, the following is claimed:

1. Apparatus comprising:

a vehicle stabilizer;

a structure which supports said stabilizer on a vehicle for movement to a deployed position projecting laterally from the vehicle so as to restrain rolling of the vehicle; and a stabilizer control system which moves said stabilizer to said deployed position;

said stabilizer control system comprising a source of energy for moving said stabilizer to said deployed position, means for sensing the occurrence of a rollover crash, and means for responding to said sensing means by actuating said source of energy upon the occurrence of a rollover crash;

said supporting structure including means for limiting movement of said stabilizer to a predetermined deployed position and for locking said stabilizer in said predetermined deployed position, said source of energy, when actuated, providing energy sufficient to move said stabilizer fully to said predetermined deployed position;

said stabilizer comprising a rod, said supporting structure comprising an axle centered on an axis, said axle having an inner surface defining a bore in which said rod is received and is slidable axially outward to said deployed position.

2. Apparatus as defined in claim 1 wherein said axle comprises said means for locking said rod in said deployed position.

3. Apparatus as defined in claim 1 wherein said source of energy comprises pyrotechnic material which, when ignited, produces combustion products including gas that develops a thrust which moves said rod outward of said bore.

4. Apparatus as defined in claim 3 wherein said axle has an opening for venting said gas from said bore.

5. Apparatus comprising:

a vehicle stabilizer;

a structure which supports said stabilizer on a vehicle for movement to a deployed position projecting laterally from the vehicle so as to restrain rolling of the vehicle; and a stabilizer control system which moves said stabilizer to said deployed position;

said stabilizer control system comprising a source of energy for moving said stabilizer to said deployed position, means for sensing the occurrence of a rollover crash, and means for responding to said sensing means by actuating said source of energy upon the occurrence of a rollover crash;

said stabilizer defining a step for a vehicle occupant to climb into and out of the vehicle.

6. Apparatus comprising:

a vehicle stabilizer;

a structure which supports said stabilizer on a vehicle for movement to a deployed position projecting laterally from the vehicle so as to restrain rolling of the vehicle; and a stabilizer control system which moves said stabilizer to said deployed position;

said stabilizer control system comprising a source of energy for moving said stabilizer to said deployed position, means for sensing the occurrence of a rollover crash, and means for responding to said sensing means by actuating said source of energy upon the occurrence of a rollover crash;

said supporting structure supporting said stabilizer for movement to said deployed position pivotally about a vertical axis;

said stabilizer being mounted on the vehicle frame and supported on a bearing;

said bearing being supported on an arm which projects laterally from said vehicle frame.

7. Apparatus as defined in claim 6 wherein said stabilizer is one of a pair of stabilizers which are movable to deployed positions pivotally about a corresponding pair of vertical axes at one side of the vehicle.

8. Apparatus as defined in claim 7 wherein said stabilizers are movable to said deployed positions pivotally about said vertical axes in opposite directions relative to one another.

9. Apparatus as defined in claim 7 wherein said stabilizer control system comprises means for moving said stabilizers to said deployed positions simultaneously.

* * * * *